US006763085B2

(12) United States Patent
Hansen et al.

(10) Patent No.: US 6,763,085 B2
(45) Date of Patent: Jul. 13, 2004

(54) IRRADIATION APPARATUS AND METHOD

(75) Inventors: Timothy B. Hansen, Novelty, OH (US); James M. McNally, Montville, OH (US)

(73) Assignee: Cleaner Food, Inc., Waite Hill, OH (US)

(*) Notice: Subject to any disclaimer, the term of this patent is extended or adjusted under 35 U.S.C. 154(b) by 172 days.

(21) Appl. No.: 10/003,668

(22) Filed: Oct. 22, 2001

(65) Prior Publication Data

US 2003/0076928 A1 Apr. 24, 2003

(51) Int. Cl.[7] .................................................. G21K 5/10
(52) U.S. Cl. ....................................................... 378/69
(58) Field of Search ........................... 378/68, 69, 148, 378/197; 426/248

(56) References Cited

U.S. PATENT DOCUMENTS

| | | |
|---|---|---|
| 4,029,967 A | 6/1977 | Tetzlaff |
| 4,066,907 A | 1/1978 | Tetzlaff |
| 4,481,652 A | 11/1984 | Ransohoff |
| 4,652,763 A | 3/1987 | Nablo |
| 4,757,201 A | 7/1988 | Kanter |
| 4,866,281 A | 9/1989 | Bosshard |
| 4,974,503 A | 12/1990 | Koch |
| 5,001,352 A | 3/1991 | Tetzlaff |
| 5,004,926 A | 4/1991 | Vassenaix et al. |
| 5,008,550 A | 4/1991 | Barrett |

(List continued on next page.)

FOREIGN PATENT DOCUMENTS

| | | |
|---|---|---|
| CA | 1287191 C | 7/1991 |
| FR | 2 252 633 A | 6/1975 |
| FR | 2298166 A | 8/1976 |
| WO | WO 87/01861 A | 3/1987 |
| WO | WO 87/01862 A1 | 3/1987 |

OTHER PUBLICATIONS

Position of the American Dietetic Association: Food Irradiation; Journal of the American Dietetic Association, Jan. 1996, pp. 69–72.
Mead, et al.; Food–Related Illness and Death in the United States; Centers for Disease Control; Sep. 1999, pp. 1–37.
Feltes; Food Irradiation; Minnesota Medicine; Nov. 1999 pp. 20–22.
21 C.F.R. Part 179—Irradiation in the Production, Processing and Handling of Food; Apr. 1, 2000, pp. 429–432.
Radsource Advertising Brochure, Future Product Description; Jul. 22, 2001, pp. 1–3 from website www.radsource.com/future/html.

(List continued on next page.)

Primary Examiner—Max H. Noori

(57) ABSTRACT

An irradiation apparatus particularly well suited to the irradiation of food at or near the point of consumption includes an irradiation chamber, one or more ionizing radiation sources such as x-ray tubes, and a rotating food support. In one embodiment, one or more x-ray sources are disposed axially in relation to the support. In another, one or more x-ray sources are disposed radially in relation to the support. The position of the x-ray sources in relation to the food may also be varied depending on the size of the food.

13 Claims, 9 Drawing Sheets

U.S. PATENT DOCUMENTS

| | | | |
|---|---|---|---|
| 5,323,442 A | * 6/1994 | Golovanivsky et al. | 378/119 |
| 5,366,746 A | 11/1994 | Mendenhall | |
| 5,396,074 A | 3/1995 | Peck et al. | |
| 5,461,656 A | * 10/1995 | Golovanivsky et al. | 378/66 |
| 5,554,856 A | 9/1996 | Bidnyy et al. | |
| 5,557,109 A | 9/1996 | Bidnyy et al. | |
| 5,577,090 A | 11/1996 | Moses | |
| 5,603,972 A | 2/1997 | McFarland | |
| 5,700,504 A | 12/1997 | Hale, Jr. | |
| 5,838,760 A | 11/1998 | Moses | |
| 5,994,706 A | 11/1999 | Allen et al. | |
| 6,006,659 A | * 12/1999 | Rosenthal | 172/388 |
| 6,051,185 A | 4/2000 | Beers | |
| 6,096,379 A | 8/2000 | Eckhoff | |
| 6,157,028 A | 12/2000 | Purtle | |
| 6,165,526 A | 12/2000 | Newman | |
| 6,180,951 B1 | 1/2001 | Joehnk et al. | |
| 6,191,424 B1 | 2/2001 | Stirling et al. | |
| 6,212,255 B1 | 4/2001 | Kirk | |
| 6,215,847 B1 | 4/2001 | Perrins et al. | |

OTHER PUBLICATIONS

Radsource Advertising Brochure, RS 2000 Biological Irradiator; Jul. 22, 2001, pp. 1–3 from website www.radsource.com/rs2000/html.

Radsource Advertising Brochure, RS 3000 X–Ray Radiation Source; Jul. 22, 2001, pp. 1–3 from website www.radsource.com/rs3000/html.

* cited by examiner

IRRADIATION APPARATUS AND METHOD

BACKGROUND

The present invention relates to the irradiation of food products using ionizing radiation such as x-rays. The invention is also applicable to irradiation in industrial, medical, sterilization or other fields in which efficient irradiation of materials is desired.

Diseases caused by contaminated food are one of the most widespread health problems in both the developed and developing countries throughout the world. The majority of these diseases, caused by biological agents such as bacteria, parasites and viral agents, are manifest by symptoms such as diarrhea, abdominal pain, nausea and vomiting. The Center for Disease Control estimates that foodborne diseases cause approximately 76 million illnesses, 325,000 hospitalizations, and 5,000 deaths annually in the United States (*Food-Related Illness and Death in the United States*, Center for Disease Control and Prevention, 1999.) More alarming is the fact that many of the pathogens of real concern today were not even recognized as causes of foodborne illness just twenty years ago.

These and other issues have been addressed by irradiation. The amount or dose of radiation to which food is exposed is a function of the duration of exposure to radiation, the density of the food, and the energy emitted by the irradiator. Relatively low doses can control trichnia in pork, inhibit ripening and extend shelf life of fruits and vegetables, and control insects and other pests. Higher doses control bacteria in poultry and other foods. Still higher doses control microorganisms in herbs, spices, teas, and other dried vegetables.

The following is exemplary of pathogen sensitivity in meat:

| Pathogen | $D_{10}$ Value (kGy) | Log Reduction at 4.5 kGy | $6D_{10}$ Reduction Dose (kGy) |
|---|---|---|---|
| Camphylocbacter | 0.18 | 25 | 1.1 |
| Clostridium | 0.586 | 7.7 | 3.5 |
| *E. coli* O157:H7 | 0.25–0.45 | 10–18 | 1.5–2.7 |
| Listeria | 0.40–0.64 | 7–11.2 | 2.4–3.8 |
| Salmonella | 0.48–0.70 | 6.4–9.4 | 2.9–4.2 |
| Staphylococcus | 0.45 | 10 | 2.7 |
| *Toxoplama gondii* | 0.40–0.70 | 6.4–11 | 2.4–4.2 |
| *Trichinella spiralis* | 0.30–0.60 | 7.5–15 | 1.8–3.6 |

$D_{10}$ values represent the x-ray dose that will result in a ten-fold reduction in pathogen concentration. Considering *E. coli* bacterium, the above chart shows that an irradiation dose of 4.5 kGy would ensure at least a ten billion-fold or 10 log reduction (log reduction column in the foregoing table) in concentration.

Over forty governments have established regulations permitting the irradiation of a wide variety of foods. Within the United States, the Food and Drug Administration (FDA) has approved the use of ionizing radiation for pathogen reduction, food preservation and disinfection for approximately 80% of the food supply. Applications now under consideration for ready-to-eat foods and shellfish will, if approved as expected, allow for irradiation of virtually all foods excepting fin fish. Regulations governing the irradiation of food are published at 9 CFR 179.26. Exemplary doses for certain foods are summarized below:

| Food Type | Maximum Dose (kGy) |
|---|---|
| Pork | 1 |
| Spices, vegetable seasonings and herbs | 30 |
| Fruit and fresh vegetables | 1 |
| Poultry (fresh, frozen or mechanically separated) | 3 |
| Red meat (fresh) | 4.5 |
| Red meat (frozen) | 7.0 |
| Shell eggs | 3 |

The FDA has granted clearance for food irradiation using ionizing radiation from three sources that have been shown to produce equivalent pathogen reductions. The approvals cover gamma rays from radioactive cobalt-60 or cesium-137, linear accelerators producing electrons at energies below 10 million electron volts, and x-rays generated from machine energies of less than 5 million electron volts.

While there are a number of large scale facilities in the United States that employ radiation technology for sterilizing of a range of products such as medical supplies, only a fraction are dedicated to food products. Common characteristics of these systems are their bulk size, scale and cost. Another common characteristic is a continuous conveyor system that supplies the food product into the irradiation chamber. Examples of such systems are disclosed in U.S. Pat. No. 4,866,281 to Bosshard, entitled Irradiation Plant; U.S. Pat. No. 5,554,856 to Bidnyy, et al., entitled Conveyor-Type Unit for Radiation Sterilization; and U.S. Pat. No. 4,481,652 to Ransohoff, entitled Irradiation Device.

Capital costs for large, production scale systems are substantial. Furthermore, the radiation sources must be shielded, often by several feet of concrete, and still provide access for food products delivered on the continuous conveyor system. To minimize per pound irradiation costs for food products, the units are often operated continuously with the typical capability to process one hundred thousand pounds of food daily. To achieve these efficiencies, the units must be located in central food processing or distribution centers that are remote from the consumer.

Machines utilizing electrons to sterilize food such as manufactured by BioSterile Technology, Inc. of Fort Wayne, Ind. are the most compact of these large production scale systems as a result of the limited penetration capability of its charged electrons. In this instance the irradiation chamber with a volume of 3.3 cubic feet is but a small component of the overall system dimensions. Nonetheless, even with a relatively small irradiation chamber, the overall size and cost of such systems remains substantial.

U.S. Pat. No. 6,212,255 to Kirk, entitled System for X-Ray Irradiation of Blood describes a smaller scale, batch irradiator for x-ray beam irradiation of blood contained within a transfusion bag. The bag is placed within a 15.5× 12×4 cm canister which limits the bag to a maximum thickness of 4 cm. A first x-ray tube is positioned to irradiate the bag from a first side, and a second tube is positioned to irradiate the bag from the opposite side. An alternate embodiment includes a single x-ray tube, which is used to irradiate the first side of the bag for a preselected time period. Thereafter, the bag is rotated, and the opposite side is irradiated for an equal period of time. In either embodiment, the distance from the output port of the x-ray tube(s) to the near side of the bag is 23 cm, and the beam geometry is selected so that the beam diameter is at least 15.5 cm at this distance. Accordingly, the extent of the x-ray beam is sufficient to irradiate the entire 15.5×12 cm extent of the bag. One disadvantage of such a system is its bulk, as the distance between the output ports of the two x-ray tubes is some 50 cm. Of this distance, the blood to be irradiated occupies at most only 4 cm, with the remainder being air. As the intensity of the x-radiation received by the blood is inversely related to the square of the separation, the intensity of the radiation received by the bag is also relatively small. Moreover, a substantial portion of the x-rays does not impinge on the blood and therefore does not contribute to its irradiation.

U.S. Pat. No. 6,180,951 B 1 to Joehnk, et al., entitled Process for Irradiating Producing Constant/Depth Dose Profile discloses an apparatus for irradiating a target material wrapped around an annular reel. The reel is rotated about an axis perpendicular to the sweep of a beam of ionizing radiation. The objective of the arrangement is to create either a constant or a linear relationship between the depth of the target material and the received dose. Joehnk teaches that the perpendicular relationship been the axis of rotation of the reel and the direction of beam sweep is critical to the function of the invention. The electron beam source is located at a distance from the target material such that beam extent is greater than the target material extent. In addition, the target material must be wrapped around the reel and occupies only a portion of the reel's diameter. In one exemplary embodiment, a material having a thickness of 1.5 inches (3.81 cm) is disposed on a 10 inch diameter (25.4 cm) core; in another a material having a thickness of 1 inch (2.54 cm) disposed on an 8 inch (20.3 cm) diameter core. These factors likewise decrease the efficiency and increase the relative size of the apparatus.

Aspects of the present invention address these matters, and others.

SUMMARY

According to a first aspect of the present invention, a food irradiation apparatus includes an x-ray source which generates and x-ray beam, and a rotating support disposed in proximity to the x-ray beam. Rotation of the support causes successive portions of the food to be exposed to the first radiation beam.

According to a more limited aspect of the invention, the x-ray source is disposed axially in relation to the food.

According to a more limited aspect of the invention, the apparatus includes a second x-ray source disposed on a side of the support opposite from the first x-ray source. According to a still more limited aspect of the present invention, the support rotates about an axis of rotation and the x-ray sources are equidistant from the axis of rotation. According to another more limited aspect of the invention, the support is disposed between the first x-ray source and the food and the second x-ray source is disposed in relation to the food such that rotation of the support causes successive portions of the food to be exposed to the second radiation beam. The distance between the second x-ray source and the support may be adjustable.

According to another more limited aspect of the present invention, the support rotates about an axis of rotation and the relative distance between the axis of rotation and the support is adjustable.

According to another more limited aspect of the invention, the x-ray source is disposed radially in relation to the food. In a still more limited aspect, the support rotates about an axis of rotation and the distance between the first x-ray source and the axis of rotation is adjustable. The relative positions of the food and the radiation source in a direction parallel to the axis of rotation may also be adjustable.

According to another more limited aspect of the invention, means for determining a dimension of a container supported by the support is included.

According to another aspect of the present invention, an irradiation apparatus includes a rotating support for supporting an objected to be irradiated and a first source of ionizing radiation. The source is disposed axially in relation to the object. Rotation of the support improves a uniformity of the radiation dose received by the object.

According to a more limited aspect of the invention, the radiation source is offset from the axis of rotation of the support. According to another more limited aspect of the present invention, the apparatus includes means for varying a position of the radiation source in at least one of an axial or radial direction. According to another more limited aspect, a sensor for determining a dimension of the object may be provided.

According to another aspect of the present invention, a batch irradiation apparatus includes an irradiation chamber and a door which provides access to the chamber for selectively inserting and removing the object. The apparatus also includes an x-ray source which generates a radiation beam that impinges on a portion of the object and a means for varying the relative positions of the x-ray source and the object so that the radiation beam impinges on successive portions of the object.

According to a more limited aspect of the invention, the object comprises food and the apparatus includes an operator input device for identifying the type of food.

According to another aspect of the present invention, a method for irradiating a quantity of food typically encountered in the home includes inserting the quantity of food into an irradiation chamber through an access port, turning on an x-ray source, varying the relative positions of the x-ray source and the food such that successive portions of the food are exposed to the x-rays generated by the source, turning off the x-ray source, and removing the quantity of food from the irradiation chamber through the access port.

One advantage of the present invention is that an apparatus and method particularly well suited to irradiating food at or near the point of use may be provided. Another advantage is that quantities of food as are typically encountered in residential and residential/small scale commercial environments may be economically irradiated.

Another advantage is that a relatively small and economical irradiation apparatus may be provided.

Still other aspects and advantages of the present invention will be understood by those skilled in the art upon reading and understanding the attached description.

DRAWINGS

DESCRIPTION

Figure 1:
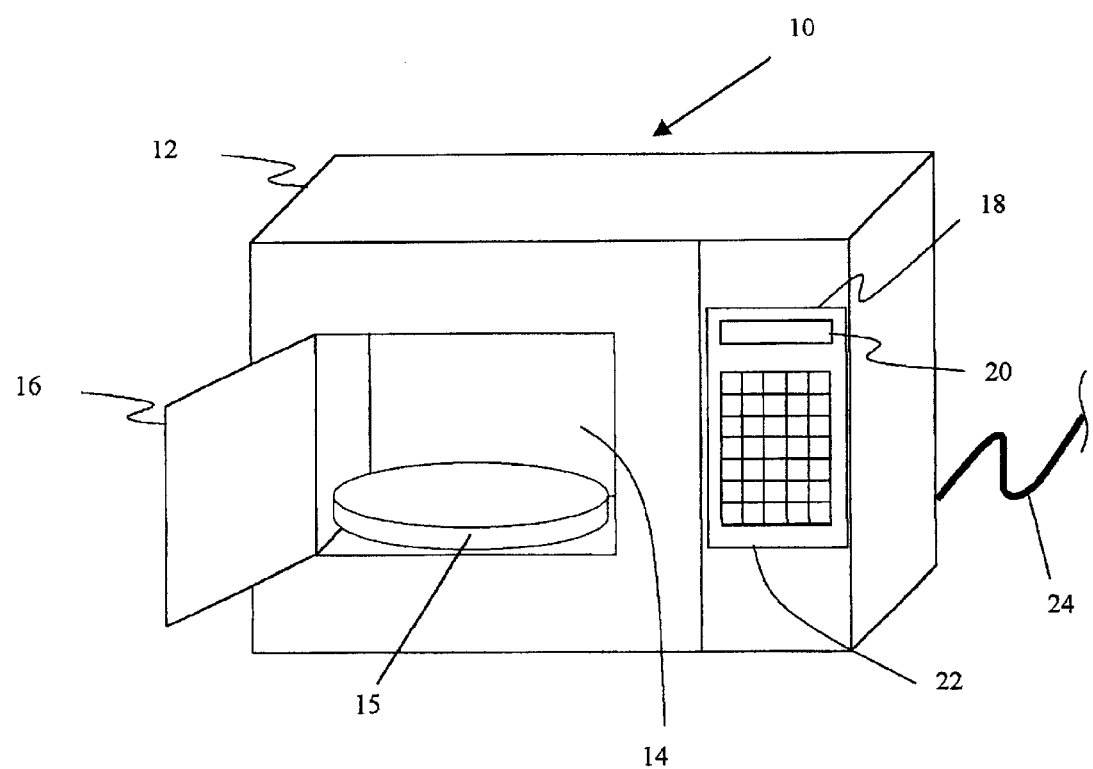
FIG. 1 is a perspective view of an irradiation apparatus.

Referring to FIG. 1, an irradiation apparatus 10 particularly well suited for use at or near the point of consumption such as in the home, a restaurant, or retail environment is shown. The apparatus 10 includes an irradiation chamber 14. In a preferred embodiment for irradiating the food volumes typically encountered in such environments (e.g., meat or like materials weighing on the order of 0.5–1 kg), the irradiation chamber has a volume less than about 2 cubic feet. Disposed within the irradiation chamber 14 is a substantially non-radiation attenuative rotating support 15 such as a platter or a topwise support from which an object may be suspended. The irradiation chamber 14 is shielded by an x-ray attenuative material such as lead. Access to the irradiation chamber is provided via a shielded door 16. While shown as hinged, access may be provided by a sliding door or other suitable arrangement. An operator interface 18 includes a suitable display 20 and operator input device 22 such as a membrane keyboard for accepting instructions from and providing operational information to a user. The unit is preferably powered by a conventional residential/commercial electric power such as a 120 15/20A or 240 volt 40A circuit through a power cord 24. Suitable power supplies, control electronics, mechanical arrangements and the like are likewise disposed within the apparatus housing 12. In particular, the controller preferably includes conventional microprocessor based circuitry, though the controller may also be implemented via suitable digital and/or analog circuitry. To reduce the size of the housing 12, items such as the power supplies may be packaged separately and connected via suitable wiring.

Figure 2:
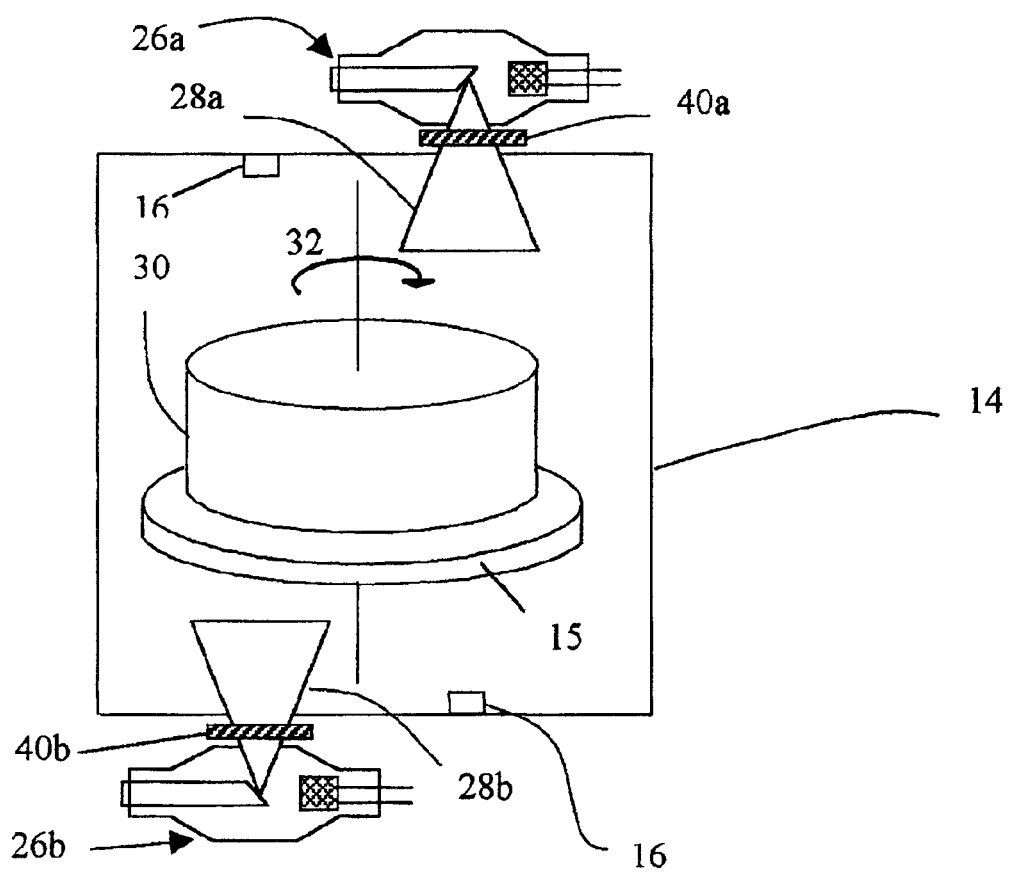
FIG. 2 depicts an axial arrangement of an irradiation apparatus.

An embodiment wherein the x-ray sources 26a, 26b are arranged axially in relation to the support 15 and an object 30 supported thereby is depicted in FIG. 2. First and second radiation sources 26a, 26b such as x-ray tubes generate respective first and second radiation beams 28a, 28b directed toward the irradiation chamber 14. A material to be irradiated 30 such as food (including any associated containers) may be placed on the rotating support 15, which rotates about an axis of rotation 32. While the object 30 is depicted as being cylindrical, the object and/or its containers may take other shapes as well. The x-ray sources 26a, 26b are offset from the axis of rotation 32 and located on opposite sides of the object 30. Dose received by the object 30 may be monitored by one or more dosimeters 16.

The x-ray tube 26a, 26b include a cathode 34 and an anode 36 disposed within a housing 38. A large voltage is maintained between the cathode 34 and anode 36, on the order of 100 kV. Accelerating within a vacuum maintained within an evacuated envelope, electrons generated at the cathode 34 strike the positively charged anode 36 and generate x-ray beams 28a, 28b. X-rays are preferentially directed out of the tubes 26a, 26b through a window with an intensity maximum along the primary beam central axis in a substantially conical radiation beams 28a, 28b. An x-ray tube designed for non-destructive material testing such as the MXR165 tube manufactured by Comet, Ag of Liegefeld-Bern Switzerland is exemplary of a suitable x-ray source.

In addition to characteristic radiation that is dependent on the anode composition, the x-ray tubes 26a, 26b produce a continuous spectrum of radiation, so-called Bremsstrahlung radiation, that ranges up to a maximum of the applied tube voltage. It is desirable that the low energy x-rays be preferentially filtered, for example by a 1 mm aluminum filter 40a, 40b, or other suitable attenuator, particularly for x-ray tubes 26a, 26b operating with an accelerating voltage of 150 kV or greater.

The foregoing arrangement provides for the efficient use of the radiation generated by the radiation sources 26a, 26b, which are placed in close proximity to the irradiated material 30. In particular, the separation between the sources 26a, 26b is minimized and preferably as close as possible to the material 30. As the distance between the source and material is reduced, the x-ray intensity along the central beam axis increases by an inverse square law. To provide for the most efficient use of the generated x-rays, the distance is chosen such that substantially all emitted radiation is received by the material. With such an arrangement, however, the dose uniformity at the material 30 surface is localized and produces a non-uniform dose distribution such that only a portion of the object 30 is exposed to the radiation beams 28a, 28b.

Figure 3:
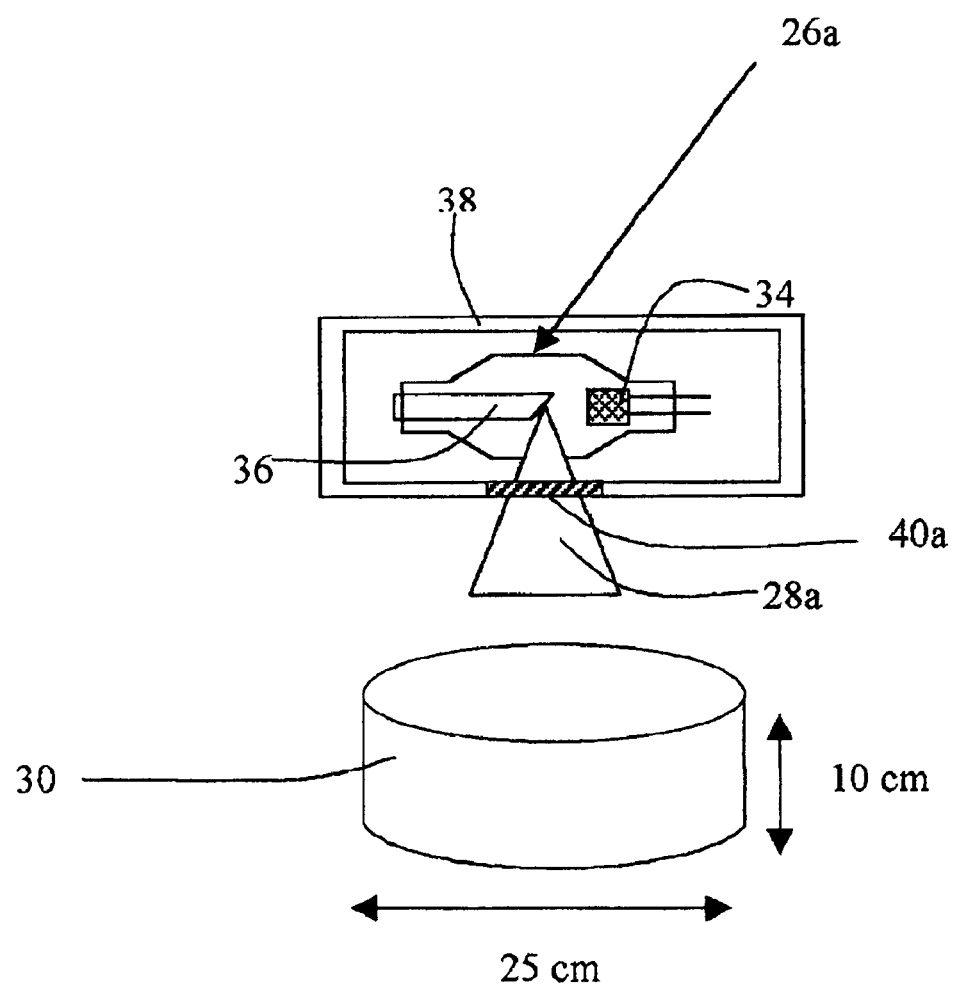
FIG. 3 depicts an axial arrangement of an irradiation apparatus.
Figure 4:
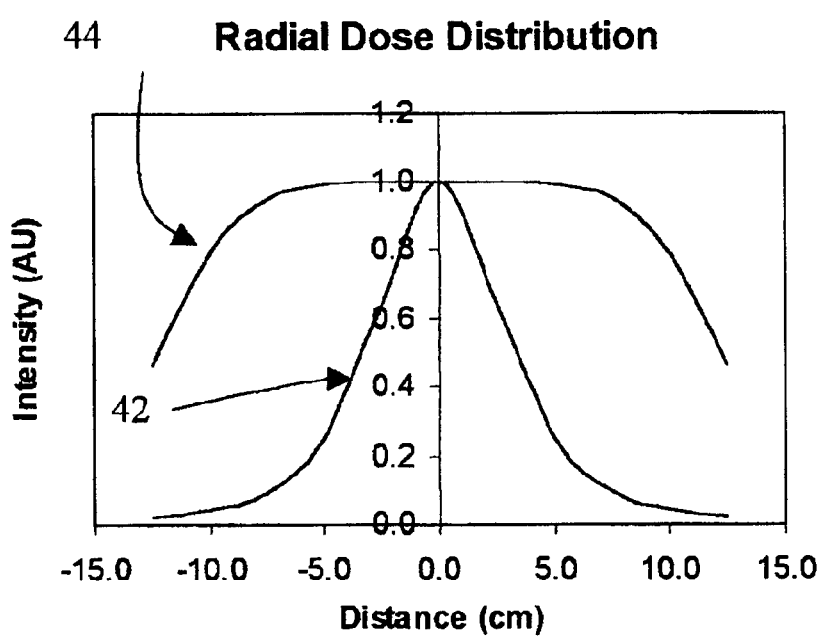
FIG. 4 depicts dose distributions at the surface of an object.

Turning now to FIG. 3, this non-uniformity may be understood for an x-ray source 26 centered 5 cm above the surface of a 25 cm diameter object 30 where the x-ray beam intensity decreases as the $\cos^2$ of the angle from the central beam axis. The dose distribution at the near surface of the object for such an arrangement is shown by plot 42 of FIG. 4, where the x-axis represents the distance from the center of the object. With the convention that the maximum dose at any point on the surface the object is denoted as $D_{max}$ and the corresponding minimum by $D_{min}$, the ratio $D_{max}/D_{min}$ may be taken as a measure of dose uniformity. In the illustrated case, the ratio at the product surface exceeds 5.

Returning for a moment to FIG. 2, dose uniformity in the foregoing arrangement can be improved by positioning the x-ray source 26b so that it is offset from the axis of rotation 32, for example by a distance equal to the radius of the object 30. If the object 30 remains stationary, however, only a portion to the object is exposed to the x-ray beam 28b.

The object 30 is rotated about axis of rotation 32 at an angular frequency that exceeds the inverse of the total exposure time to ensure at least one complete rotation through 360 degrees during the irradiation period. The radial dose distribution for such an arrangement is shown by plot 44 of FIG. 4, again where the x-ray beam intensity decreases as the $\cos^2$ of the angle from the central beam axis. As will be appreciated, the dose distribution is substantially more uniform than that of plot 42. While the foregoing has focused on radiation source 26b, positioning radiation source 26a in a complementary fashion produces a similar result at the other surface of the object. The relative positions described above may be varied, depending on the desired dose uniformity and irradiation time, the shape and distribution of the x-ray beam 28, the dimensions and shape of the object 30, x-ray utilization efficiency, and the like.

It is desirable that irradiation be accomplished in a time frame similar to that for conventional microwave cooking. As an example, consider an x-ray source delivering a dose of 0.8 kGy/minute at a distance of 5 cm. Irradiation of 1 kg of unfrozen red meat to a dose of 4 kGy can be accomplished in approximately 5 minutes.

Dose uniformity in the depth direction is determined in part by the attenuation of the radiation in the object 30.

Figure 5:
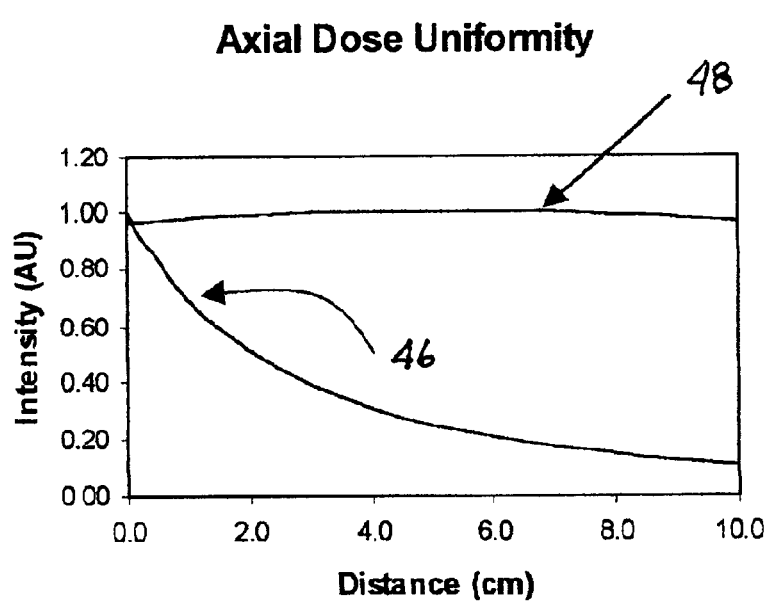
FIG. 5 depicts depthwise dose distributions in relation to an object.

Turning now to FIG. 5, plot 46 approximates the depthwise dose distributions where the object 30 is irradiated from a single side, and where the x-axis represents distance from the surface of the object. As illustrated by plot 48, depthwise uniformity may be improved by irradiating the object from the second side.

While a device having two radiation sources 26a, 26b disposed on opposite sides of the object has been described, it will be appreciated that one of the radiation sources may be omitted. In one such embodiment, the source 26 and the rotating support 15 are arranged so that the distance between the source and the object 30 is substantially constant irrespective of the depth of the object (e.g., the support 15 is disposed between the source 26 and the object 30). Alternately, one or both of the radiation sources 26a, 26b may be movable in the axial direction depending on the depth of the object 30 so as to maintain the desired distance between the source(s) 26a, 26b and the object 30, for example using a motor drive arrangement. Such an arrangement is particularly advantageous where the device will be used to irradiate food or other objects having differing axial dimensions.

One or both of the radiation beams 28a, 28b may also be movable in the radial direction depending on the radial extent of the object 30, for example using a motor drive arrangement operatively connected to the sources 26a, 26b. Such an arrangement is particularly advantageous where the device will be used to irradiate food or other objects having differing radial dimensions.

According to yet another embodiment, two or more radiation sources 26 may be located on the same side of the object.

Figure 6:
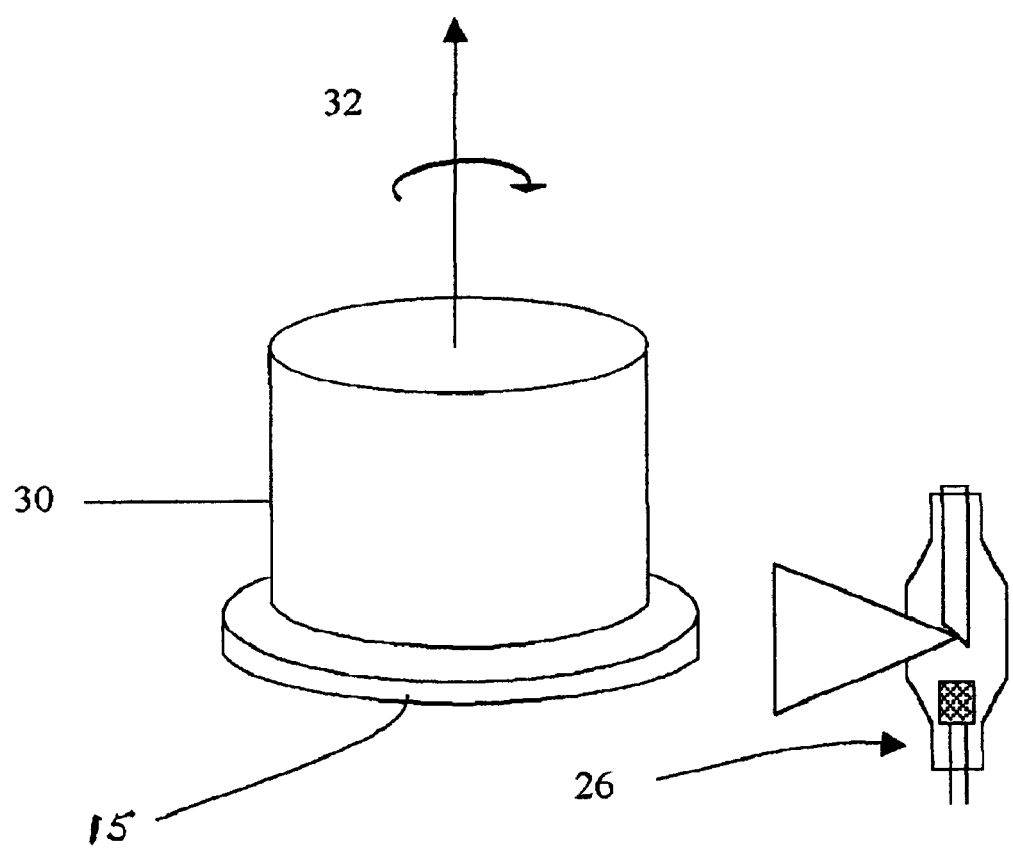
FIG. 6 depicts a radial arrangement of an irradiation apparatus.

Turning now to FIG. 6, the x-ray source 26 may be disposed radially with respect to the object 30. By analogy to the axial arrangement described above, the x-ray source may be located at a distance from the axis of rotation 32 which exceeds the approximate radial extent of the object 30. In one embodiment, the x-ray source 26 is located at as near as possible to the object, e.g. at approximately the radial extent of the object. Again, the object 30 is rotated about the axis of radiation 32 to improve dose uniformity.

Figure 7:
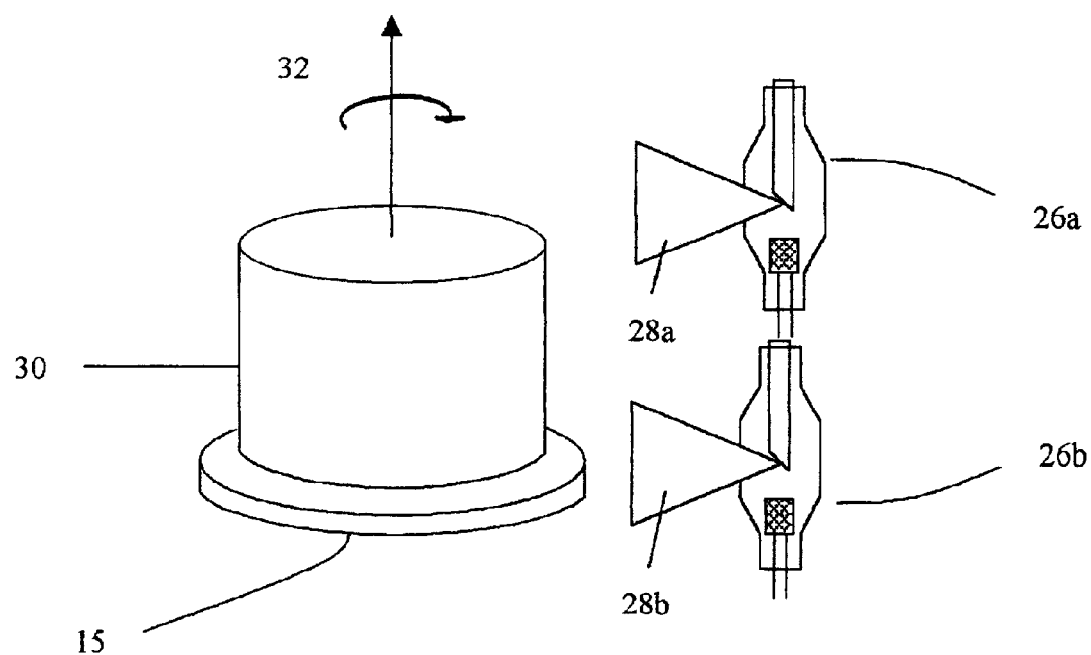
FIG. 7 depicts a radial arrangement of an irradiation apparatus.

Turning now to FIG. 7, two or more x-ray sources 26a, 26b may be disposed radially in relation to the object. Such an arrangement has the advantage of improving axial dose uniformity without requiring or minimizing axial movement of the x-ray beams 28 Depending on the axial extent of the object 30, the x-ray beam 28 and the object 30 may moved relative to each other to improve axial dose uniformity. Relative axial motion may be achieved by a drive arrangement operatively connected to the x-ray source 26.

In addition, the radiation source(s) 26a, 26b and the object 30 may be movable relative to each other in the radial direction to maintain a desired distance between the source(s) and the object, for example using a motor drive arrangement connected to the support 15 or the source 26. Such an arrangement is particularly advantageous where the device will be used to irradiate food or other objects with different radial dimensions.

The axial and/or radial extent of the object 30 may be determined in various ways. For example, dimensional information may derived from dosimeters 16 which provide low resolution image-like information. Dimensional information may also be derived from information specific to food product containers of various sizes. Thus, the apparatus may be designed to work with a series of containers having predefined sizes, where the user is instructed to place the object 30 in the container most closely approximating the object's dimensions. The containers may themselves provide dimensional data, for example by unique mechanical keys or interlocks, electrical contacts, or magnetic elements which cooperate with corresponding devices associated with the irradiation apparatus 10. Alternately, the containers may be coded with dimensional information (e.g., small, medium, large, or 3 cm, 5 cm, 10 cm, etc.) or color coded with user asked to enter the information through the operator interface 18. According to yet another embodiment, positioning members may be provided with the apparatus 10. Position measurement devices such as potentiometers indicate the location of the positioning members. Upon placing the food or the container on the support 15, the user then positions the straps or guides in contact therewith so that the approximate dimensions are known.

In certain instances, it may be preferable to reduce the air pressure within the irradiation chamber 14 or a closer-fitting food container to minimize undesirable organoleptic effects. A partial vacuum may be effected by a roughing pump or through water aspiration. Further, it may be desirable to reintroduce an artificial atmosphere to surround the food product during irradiation. Suitable ports and valves for providing and/or recycling the atmosphere may optionally be provided.

It may be desirable to combine the effects of irradiation with other procedures in the food preparation process. Accordingly, yet another embodiment of the present invention combines technologies for such food processing in a single appliance. Specifically, a provision for directing ultrasonic energy into the food product is provided for the benefit of tenderizing meat or other products. Ultrasonic radiation may be further analyzed to determine additional food properties including density or position within the irradiation chamber. Incorporation of a microwave-generating device operating in the frequency range of conventional microwave ovens allows for the heat treatment or cooking of the food products. The irradiation appliance may also be combined to deliver a desired cooking level with the combination of conventional, convection or halogen based heating oven technology.

Figure 8:
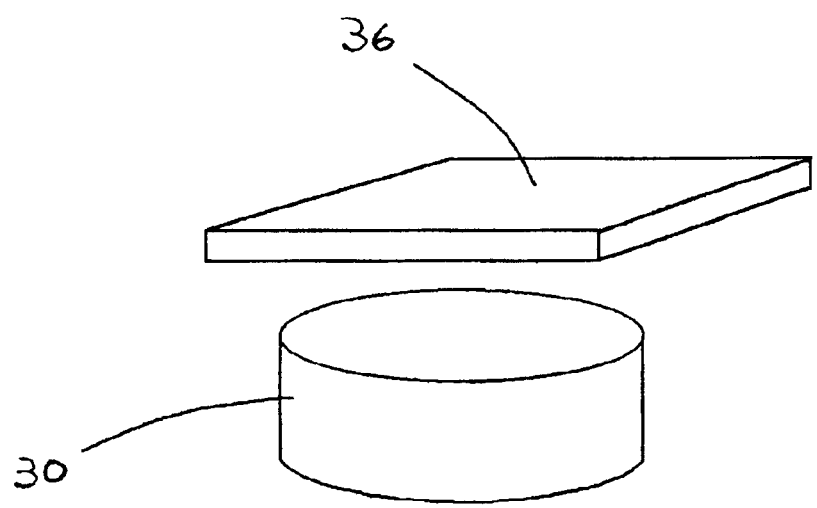
FIG. 8 depicts an x-ray source having a large planar anode.

Still other configurations of the x-ray source 26 are contemplated. In particular, increasing the x-ray source 26 focal spot size reduces localized anode heating, increases x-ray beam coverage, and reduces distance dependent intensity reduction. Referring to FIG. 8, the source includes a large planar anode 36 constructed of conventional thick target material such as tungsten and may be of a reflective or transmission type thickness. While shown as a rectangular surface, any number of planar geometries are possible. As a practical method, the cathode filament may be distributed in a manner to enhance current flow near the perimeter of the anode to account for its truncation. As is appreciated by those skilled in the art, the corresponding cathode and surrounding vacuum housing are not shown for simplicity. The anode 36 is preferably displaced from the object 30 by a distance approximately equal to the depth of the object. Depending on the relative sizes of the x-ray beam and the object, acceptable dose uniformity may be achieved without rotation of the object 30.

Figure 9:
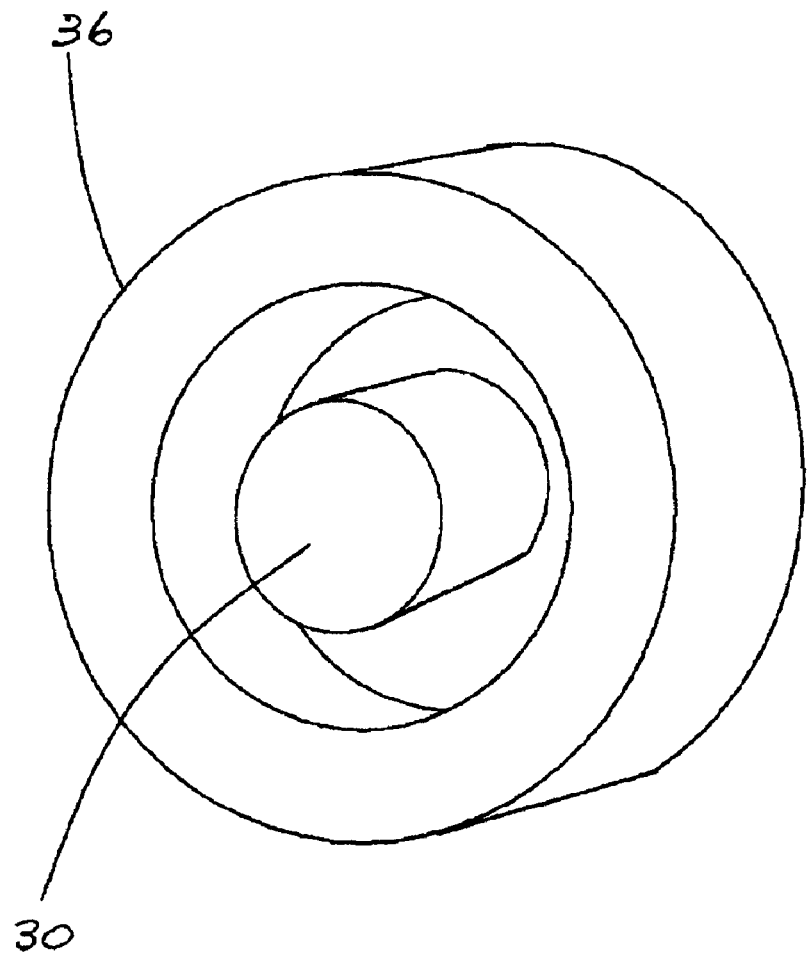
FIG. 9 depicts an x-ray source having a cylindrical anode.

Referring to FIG. 9, the large area anode 36 may be extended to include a cylindrical three-dimensional geometry. In this configuration, object 30 is surrounded by the cylindrical anode 36. As is appreciated by those skilled in the art, the cylindrical cathode and surrounding vacuum housing are not shown for simplicity.

The foregoing discussion has assumed that the x-ray source(s) 26 remain stationary while the support 15 rotates.

Equivalent results may be achieved by causing the x-ray source(s) to rotate about the object. Moreover, the effective position of the x-ray source(s) 26 may be varied by magnetically deflecting the electron beam before it strikes the x-ray tube anode 36.

In operation, the food to be irradiated, together with any desired container, may be placed on the object support 15 and the door 16 closed. The operator interface 18 facilitates entry of desired irradiation parameters. For example, the user may input information relating to the type of food, quantity of food, and/or desired radiation dose. Dose information may be provided by direct entry of the desired dose or irradiation time, or by entry of a desired effect such as ripening rate reduction, shelf-life extension, or pathogen reduction. The processing electronics in turn determines the desired irradiation time and other relevant parameters. Moreover, the relative positions of the object being irradiated 30 and the x-ray source(s) may be adjusted as necessary.

During irradiation, the support 15 is rotated about its axis of rotation 32 so that successive portions of the object 30 are exposed to the radiation beam(s) 28. Any required axial or other motion of the radiation beams 28 is also accomplished. Under control of the control electronics, irradiation continues for the calculated time or until the dosimeter(s) 16 indicate that the desired dose has been achieved (information from one or more dosimeters may be combined to improve accuracy of the dose measurement). Optional tenderizing, microwaving, or other processing may also occur. Status information is provided to the user via the operator interface 18. Upon completion of the process, the object 30 may be removed from the irradiation chamber 14.

The invention has been described with reference to the preferred embodiments. Of course, modifications and alterations will occur to others upon reading and understanding the preceding description. It is intended that the invention be construed as including all such modifications an alterations insofar as they come within the scope of the appended claims or the equivalents thereof.

We claim:

1. A food irradiation apparatus comprising:

a first x-ray source which generates a first radiation beam a rotating support disposed in proximity to the first x-ray source, wherein rotation of the support causes successive portions of food supported by the support to be exposed to the first radiation beam, wherein the support is disposed between first x-ray source and the food;

a second x-ray source disposed on a side of the support opposite from the first x-ray source wherein the distance between the second x-ray source and the support is adjustable.

2. A food irradiation apparatus comprising:

a first x-ray source which generates a first radiation beam;

a rotating support disposed in proximity to the first x-ray source, wherein rotation of the support causes successive portions of food supported by the support to be exposed to the first radiation beam, wherein the support rotates about an axis of rotation and the distance between the axis of rotation and the first x-ray source is adjustable.

3. The apparatus of claim 2 wherein the first x-ray source is disposed radially in relation to the food.

4. The apparatus of claim 3 wherein the support rotates about an axis of rotation and the relative position of the food and the first radiation source in a direction parallel to the axis of rotation is adjustable.

5. The apparatus of claim 2 further including means for determining a dimension of a container supported by the support.

6. The apparatus of claim 1 wherein the x-ray source comprises an x-ray tube including a cathode and an anode.

7. The apparatus of claim 1 further including an irradiation chamber sized to receive a quantity of food typically encountered at or near the point of consumption and wherein the x-ray source comprises an x-ray tube having a cathode and an anode.

8. The apparatus of claim 2 wherein the x-ray source comprises an x-ray tube including a cathode and an anode.

9. The apparatus of claim 2 further including an irradiation chamber sized to receive a quantity of food typically encountered at or near the point of consumption and wherein the x-ray source comprises an x-ray tube having a cathode and an anode.

10. An irradiation apparatus comprising:

a rotating support for supporting an object to be irradiated, which support rotates about an axis of rotation;

a first source of ionizing radiation for irradiating the object, the source being disposed axially in relation to the object, wherein rotation of the support improves a uniformity of the radiation dose received by the object;

a sensor for determining a dimension of the object.

11. The apparatus of claim 10 wherein the apparatus includes an operator input device for identifying the type of food.

12. The apparatus of claim 10 further including an irradiation chamber sized to receive a quantity of food typically encountered at or near the point of consumption.

13. An irradiation apparatus comprising:

a rotating support for supporting and object to be irradiated, which support rotates about an axis of rotation, a first source of ionizing radiation for irradiating the object, the source being disposed axially in relation to the object, wherein rotation of the support improves a uniformity of the radiation dose received by the object;

means for varying a position of the first radiation source relative to the support in at least one of an axial or radial direction.

* * * * *